United States Patent [19]

Nishimura et al.

[11] Patent Number: 4,805,018
[45] Date of Patent: Feb. 14, 1989

[54] VIDEO SIGNAL PROCESSING APPARATUS FOR SEPARATING AN IMAGE OF A MOVING OBJECT FROM VIDEO SIGNALS

[75] Inventors: Shigeru Nishimura, Tokyo; Toshihisa Kuroda; Shin-ichiro Aoki, both of Kanagawa, all of Japan

[73] Assignee: Matsushita Electric Industrial Co., Ltd., Osaka, Japan

[21] Appl. No.: 23,663

[22] Filed: Mar. 9, 1987

[30] Foreign Application Priority Data

| Mar. 7, 1986 | [JP] | Japan | 61-51132 |
| Apr. 18, 1986 | [JP] | Japan | 61-90432 |
| Apr. 18, 1986 | [JP] | Japan | 61-90434 |
| Oct. 2, 1986 | [JP] | Japan | 61-234821 |
| Oct. 2, 1986 | [JP] | Japan | 61-234822 |

[51] Int. Cl.$^4$ .................. H04N 5/232; H04N 7/18
[52] U.S. Cl. ..................... 358/105; 358/96; 358/125
[58] Field of Search .............. 358/105, 96, 125, 126

[56] References Cited

U.S. PATENT DOCUMENTS

| 3,781,468 | 12/1973 | Chomet | 358/105 |
| 3,988,533 | 10/1976 | Mick | 358/105 |
| 4,025,718 | 5/1977 | Paretti | 358/105 |
| 4,219,847 | 8/1980 | Pinkney | 358/105 |
| 4,220,967 | 9/1980 | Ichida | 358/105 |
| 4,405,940 | 9/1983 | Woolfson | 358/125 |
| 4,675,736 | 6/1987 | Lehmer | 358/210 |

Primary Examiner—Howard W. Britton
Attorney, Agent, or Firm—Wenderoth, Lind & Ponack

[57] ABSTRACT

In a video signal processing apparatus, a contour signal of a moving object is separated from static background video image signals. The video signal photographed by a television camera is converted into a binary contour signal. One converted signal obtained at a certain time and another converted signal obtained at another time are processed to extract a contour signal of the moving object. The extracted contour signal of the moving object is supplied to a circuit which controls panning and/or tilting of the television camera.

12 Claims, 10 Drawing Sheets

VIDEO SIGNAL PROCESSING APPARATUS FOR SEPARATING AN IMAGE OF A MOVING OBJECT FROM VIDEO SIGNALS

BACKGROUND OF THE INVENTION

The present invention relates to a video signal processing apparatus for separating a profile image of a moving object from a static background obtained by a television camera.

Recently, television camera has become popular in industrial uses, such as factory automation processes, remote observation, and so on. In these uses, the television camera is requested for to change its image pickup angle or to track a moving object. In the conventional television camera, the image pickup angle is controlled by an output signal level of the television camera. However, this method cannot separate a moving image from a static background image. Therefore, it is difficult to recognize moving object surely. This is inferior in controlling the image pickup angle of the television camera, and in tracking the moving object.

SUMMARY OF THE INVENTION

It is therefore an object of the invention to separate or extract an image of a moving object from a static background image obtained by a image pickup device.

It is another object of the present invention to the control image pickup angle of the image pickup device easily and surely.

It is a further object of the present invention to track a moving object surely with the image pickup device.

According to the present invention, a video signal processing apparatus is provided which comprises a contour image signal extracting circuit for generating a contour image signal of an object from a video signal obtained by an image pickup device, an operation circuit for logically adding the contour image signals obtained in different time periods, and a means for extracting a contour signal of a moving object from the output signals of the contour image signal extracting circuit and the operation circuit.

The extracted contour signal of the moving object is applied to tracking the moving object with the image pickup device.

BRIEF DESCRIPTION OF THE INVENTION

The object and features of the present invention will become more readily apparent from the following detailed description of the preferred embodiments taken in conjunction with the accompanying drawings in which.

DETAILED DESCRIPTION OF THE INVENTION

Figure 1:
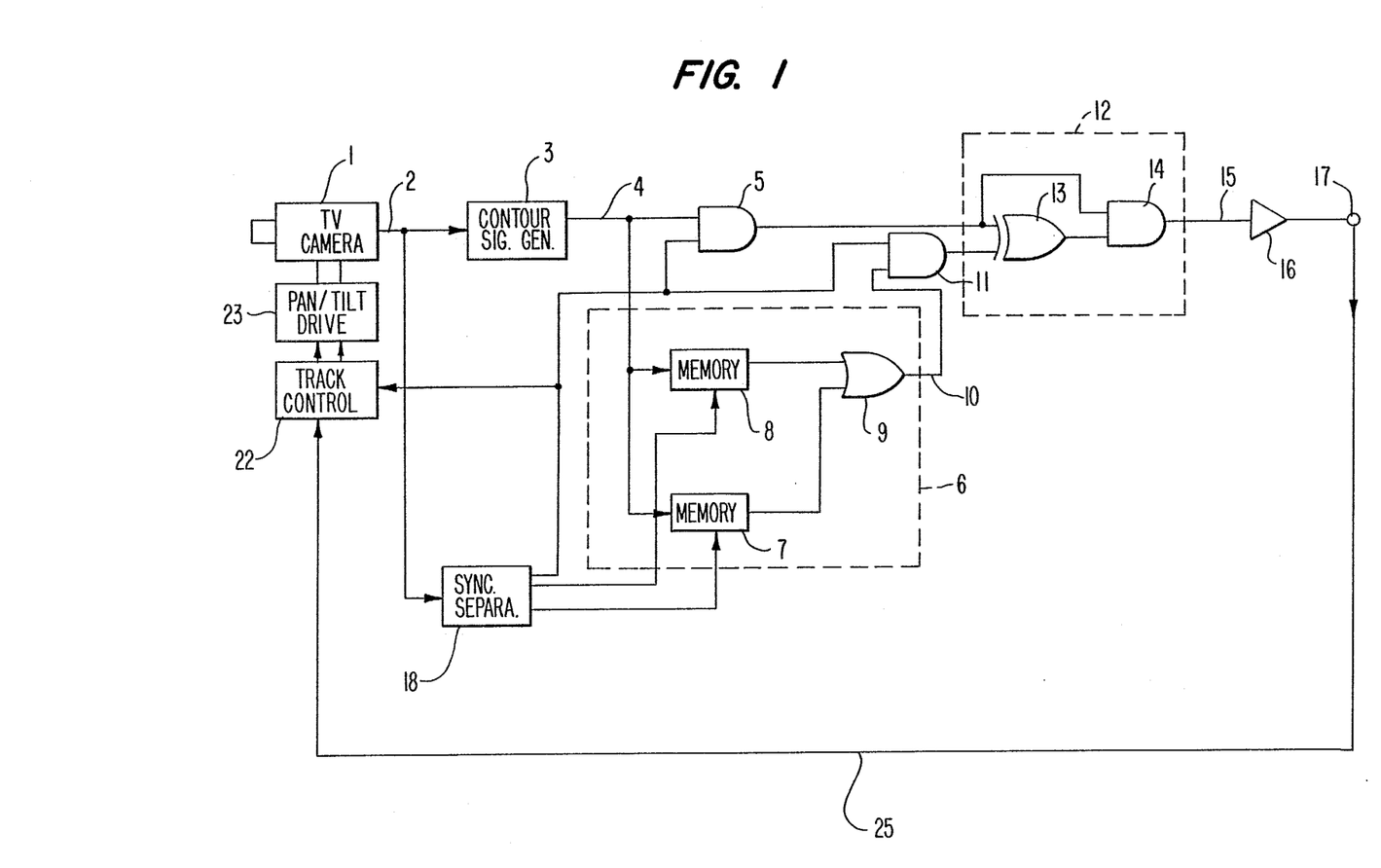
FIG. 1 is a block diagram of an embodiment of the video signal processing apparatus according to the present invention.
Figure 2:
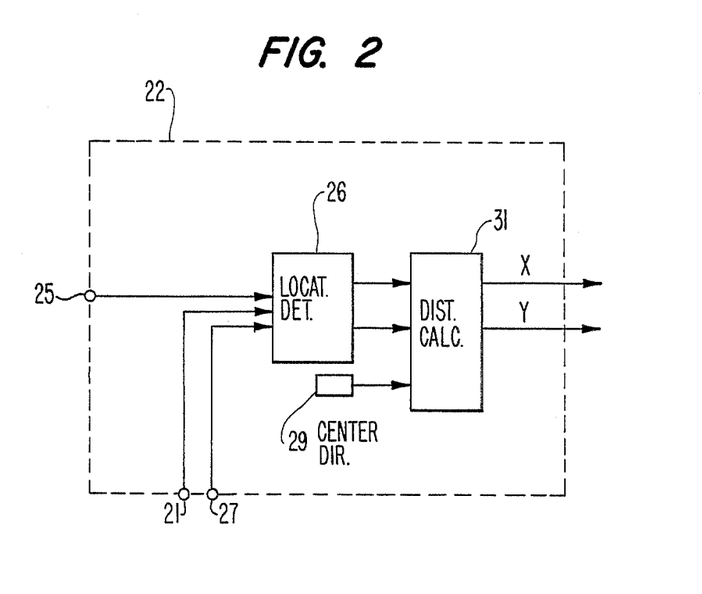
FIG. 2 is a detailed block diagram of a part of the video signal processing apparatus of FIG. 1.
Figure 3:
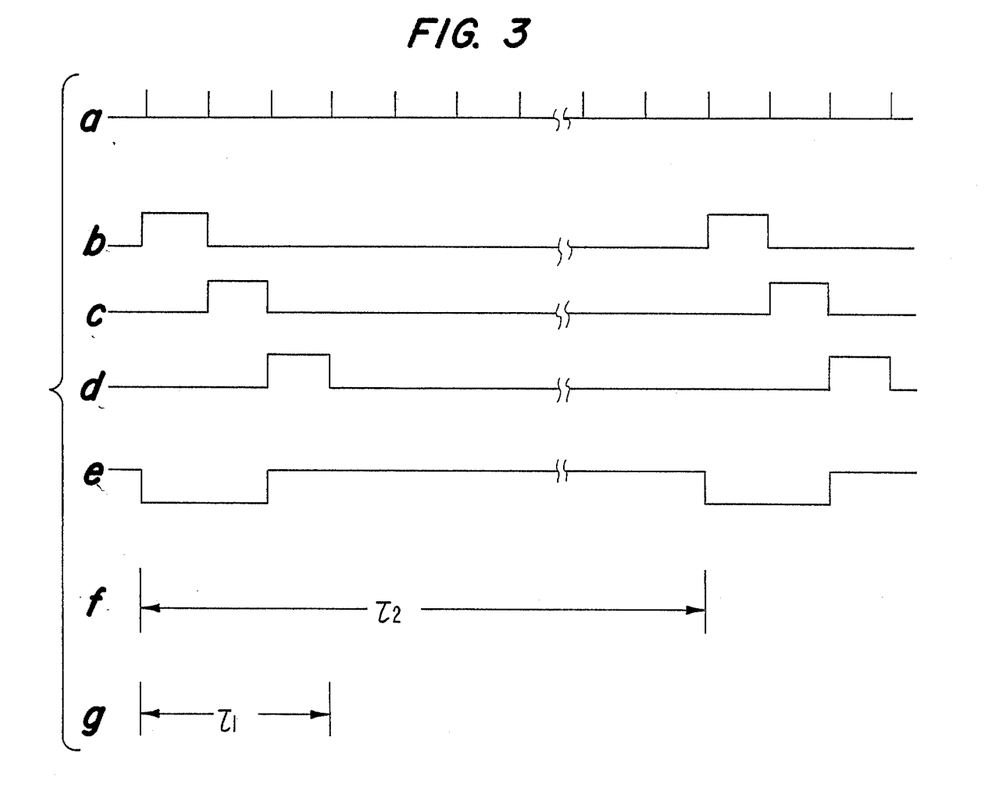
FIG. 3 is a timing chart for explaining the embodiment of FIG. 1.

Referring now to FIGS. 1 through 3, a preferred embodiment will be explained. A video signal 2 obtained by a television camera 1 is supplied to a contour image signal generating circuit 3. The circuit 3 generates a binary contour signal 4 of about 1 volt peak to peak from the video signal 2. The contour signal 4 is stored in a memory circuit 7 during a high level period (which corresponds to one field period) of memory control signal 3b of FIG. 3. The memory control signal 3b is generated in synchronism with vertical driving pulses 3a which are obtained by a synchronizing separator circuit 18 of FIG. 1. The contour signal 4 in the next field is also stored in a memory circuit 8 during high level period of memory control signal 3c of FIG. 3. The output signals from the memory circuits 7 and 8 are added logically by an OR circuit 9 to generate a delayed contour signal 10 which is supplied to one of the input terminal of a gate circuit 11. A gate signal 3d of FIG. 3, which corresponds to the followed field period to the field period 3C of FIG. 3, obtained by the synchronizing separator circuit 18 is supplied to a gate circuit 5 and the gate circuit 11. Therefore, the contour signal 4 from the contour image signal generating circuit 3 and the delayed contour signal 10 from an operating circuit 6, which is composed of the memory circuits 7, 8 and OR circuit 9, are supplied to a contour extracting circuit 12 during the period of the gate signal 3d of FIG. 3. The contour extracting circuit 12 is composed of an EXCLUSIVE OR circuit 13 and an AND circuit 14. The contour signal 15 of the moving object extracted from the contour extracting circuit 12 is output during the period of the gate signal 3d and amplified to a certain level by an amplifier 16. The output signal 25 from the output terminal 17 of the amplifier 16 is supplied to a track control circuit 22 to generate camera control signal X and Y.

The track control circuit 22 will be discussed with reference to FIG. 2. The gate signal 3d is supplied to a location detecting circuit 26, which detects co-ordinates of the moving object on a display, through a terminal 21. A ready signal 3e obtained by the gate signal 3d is also supplied to the location detecting circuit 26 through a terminal 27. The output signal 25 is converted into a dot data signal by being sampled with the clock signal 3a obtained by the synchronizing separator circuit 18, and supplied to another input terminal of the location detecting circuit 26. The location detecting circuit 26 computes a dot number and X and Y of values of an address from the dot data during one field period determined by the gate signal 3d, and outputs $\Sigma X/n$ and $\Sigma Y/n$. The outputs $\Sigma X/n$ and $\Sigma Y/n$ correspond to values of coordinates $P_{1(x1, y1)}$ of the moving objects of FIG. 4A, and are supplied to a distance calculator circuit 31. A center directing circuit 29 outputs data for designating a center point of an effective reproduction picture on a display to the distance calculator circuit 31.

Figure 4A:
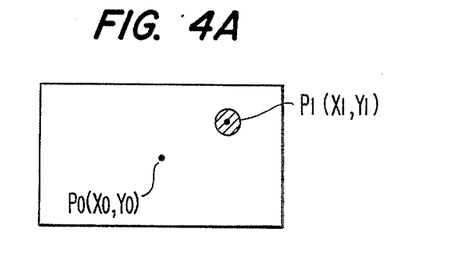
FIGS. 4A and 4B are explanatory diagrams showing the functions for obtaining the deviation between the center of gravity of the contour signal and a center of an effective image picture on a display.

The data is shown as $P_0(x_0, y_0)$ in FIG. 4A. The distance calculation circuit 31 calculates distances $\Delta x_1 = x_1 - x_0$ and $\Delta y_1 = y_1 - y_0$ between the points $P_0$ and $P_1$ of FIG. 4A. The calculated $\Delta x_1$ and $\Delta y_1$ are converted into pulse signals X and Y for driving a stepping motor of a pan/tilt driving means 23. The stepping motor drives the television camera 1 for panning or tilting. Thus, the moving object in the picked up image is tracked by the television camera 1 in such a manner that the image of the moving object is always located on a center portion of the effective picture on the display.

Figure 4B:
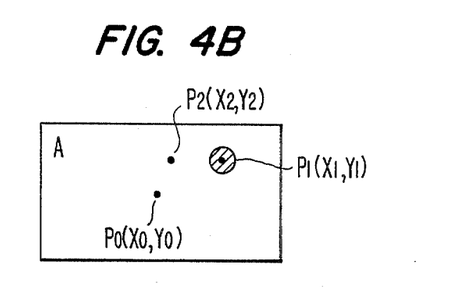

It the operating circuit 6 is omitted, a background image remains on the picture image as shown by the notation A of FIG. 4B. As a result, the center of the gravity of the image moves the a point $P_2(x_2, y_2)$, so that the television camera 1 cannot track the moving object $P_1$.

The operation of the track control circuit 22 is performed during the ready signal 3e of FIG. 3. During the time period $\tau$ of 3g, signal data of the moving object without a background image is obtained, and after it, the calculation of X and Y values and the driving the television camera 1 is performed during period $\tau_2$ of 3f of FIG. 3. As described above, the television camera 1 repeats tracking the moving object continuously with the period $\tau_2$.

Figure 5:
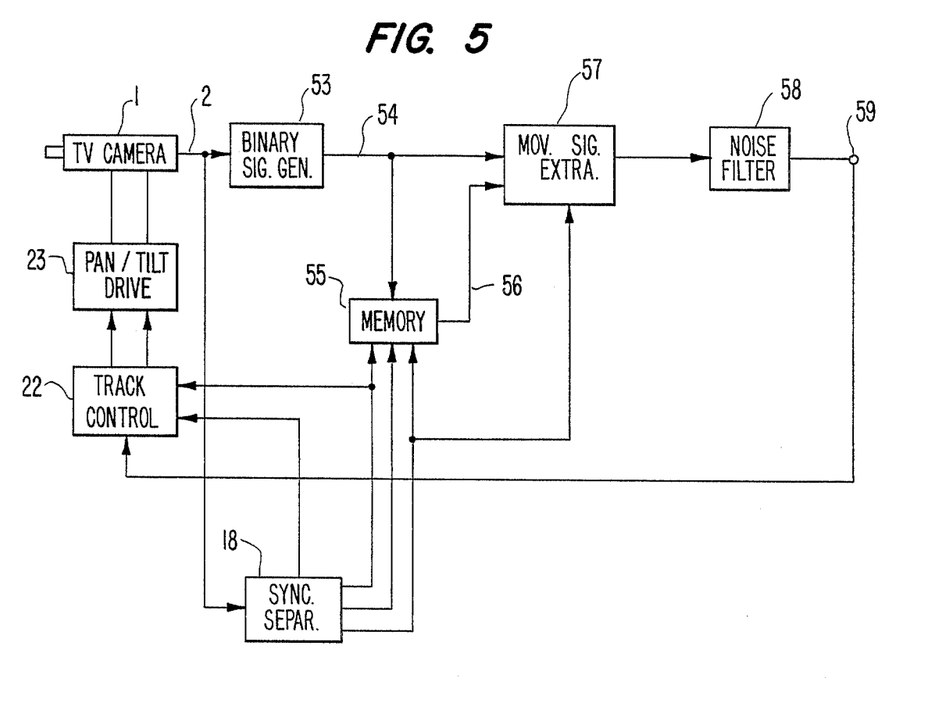
FIG. 5 is a block diagram of another embodiment of the video signal processing apparatus according to the present invention.
Figure 7:
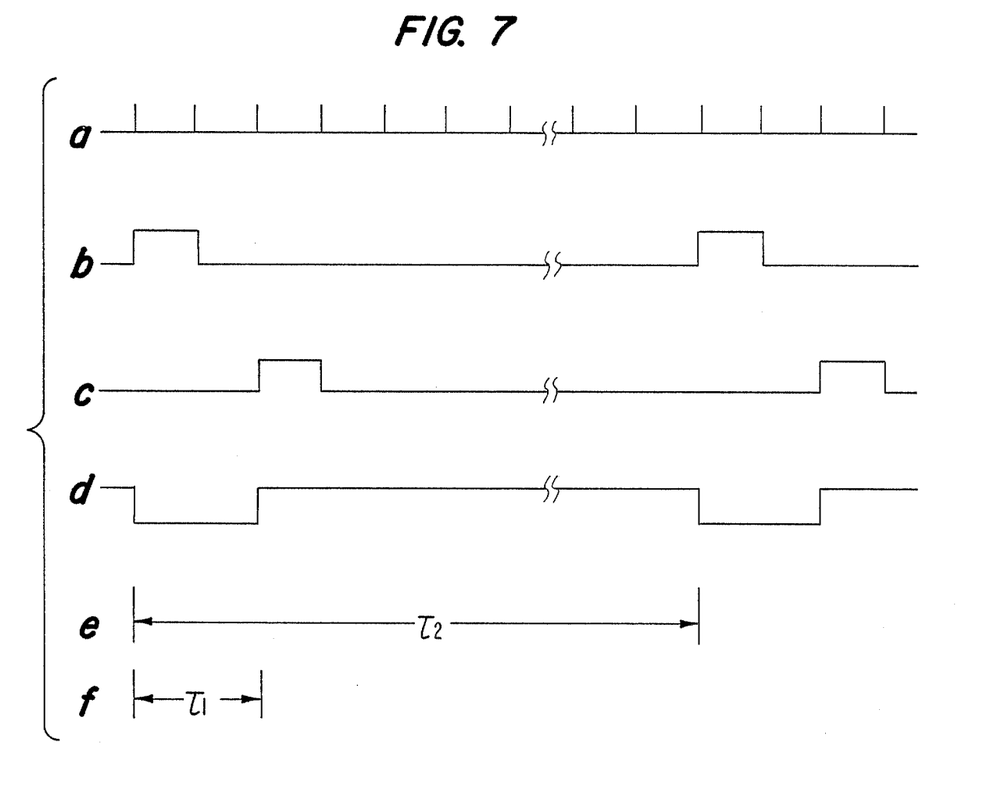
FIG. 7 is a timing chart for explaining the embodiment of FIG. 5.

FIG. 5 is another embodiment of the video signal processing apparatus according to the present invention. The same parts and elements are labeled with same reference numerals as those of FIG. 1. The output signal 2 of the television camera 1 is supplied to binary signal generator 53 which converts the output signal 2 into a binary signal 54. The binary signal 54 of one field or one frame period from the binary signal generator 53 is stored in a memory circuit 55 under the control of the memory writing control signal 7b of FIG. 7. The stored binary signal is read out from the memory circuit 55 under the control of the memory reading out control signal 7C of FIG. 7, and the read out signal 56 is supplied to a moving signal extracting circuit 57. The binary signal 54 is also supplied to the moving signal extracting circuit 57. The moving signal extracting circuit 57 logically operates the binary signal 54 and the read out signal 56 during a high level period of the memory reading out control signal 7C of FIG. 7 to extract only a signal of the moving object.

Figure 6:
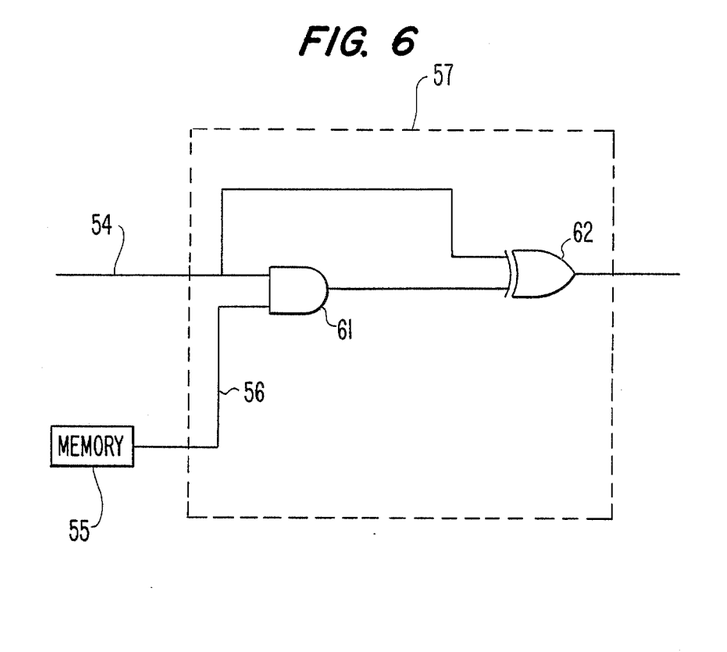
FIG. 6 is a detailed block diagram of a part of the video signal processing apparatus of FIG. 5.

The moving signal extracting circuit 57 is composed of and AND circuit 61 and an EXCLUSIVE OR circuit 62 as shown in FIG. 6. The logical product of the binary signal 54 and the read out signal 56 from the memory circuit 55 is obtained by the AND circuit 61 and the output of which is supplied to the EXCLUSIVE OR circuit 62. The EXCLUSIVE OR circuit 62 extracts only the signal of the moving object from the binary signal 54 and the output of the AND circuit 61.

Referring back to FIG. 5, the output of the moving signal extracting circuit 57 is supplied to a noise filter 58 to remove noise, and is supplied to the track control circuit 22 through output terminal 59.

The operations of the track control circuit 22 and the pan/tilt driving means 23 are the same as those of FIG. 1, so that an explanation thereof will be omitted herewith.

Figure 8:
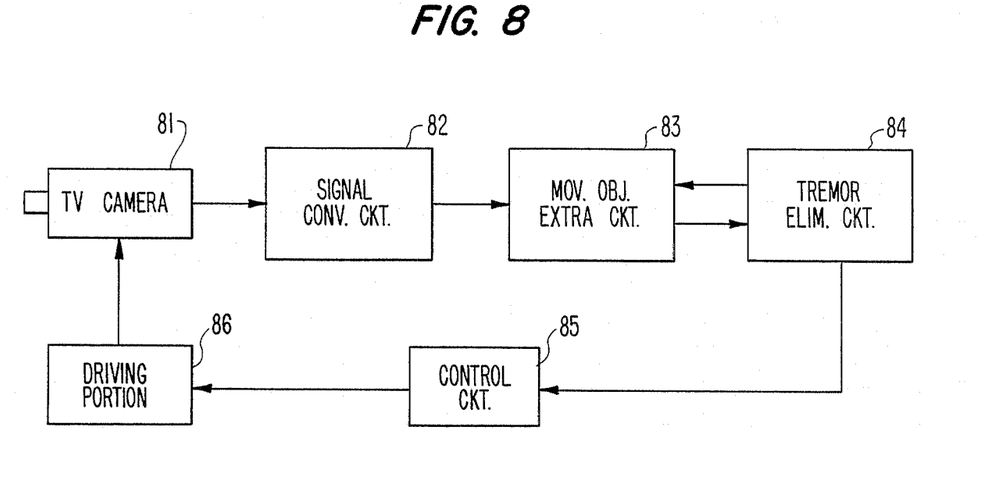
FIG. 8 is a block diagram of a further embodiment of the video signal processing apparatus according to the present invention.

Referring now to FIG. 8, a further embodiment of the present invention will be discussed. A video signal obtained by a television camera 81 is converted into a contour image signal by a signal conversion circuit 82. A noving object extracting circuit 83 compares the contour image signal obtained from the signal conversion circuit 82 with that obtained after a predetermined time, and extracts different image signal components as a signal of a moving object. The thus obtained signal from the moving object extracting circuit 83 is supplied to a tremor eliminating circuit 84 to eliminate tremor components of the image signal generated by the effects of wind and so on. The signal of the moving object without the tremor component obtained from the tremor eliminating circuit 84 is supplied to a control circuit 85. The output of the control circuit 85 controls a driving portion 86 of the television camera 81 to pan and tilt the television camera 81 in such a manner that the television camera 81 always tracks the moving object.

Figure 9:
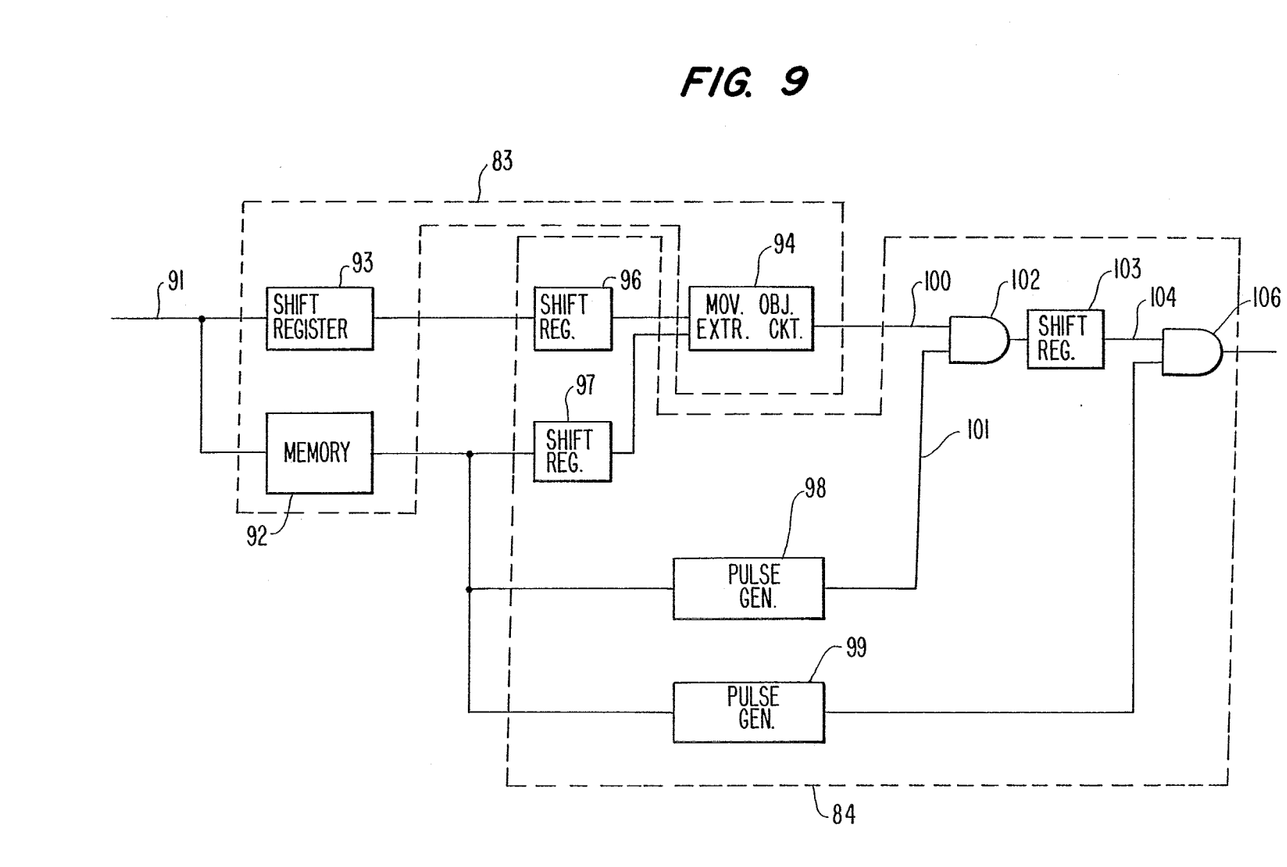
FIG. 9 is a detailed block diagram of a part of the video signal processing apparatus of FIG. 8.
Figure 10:
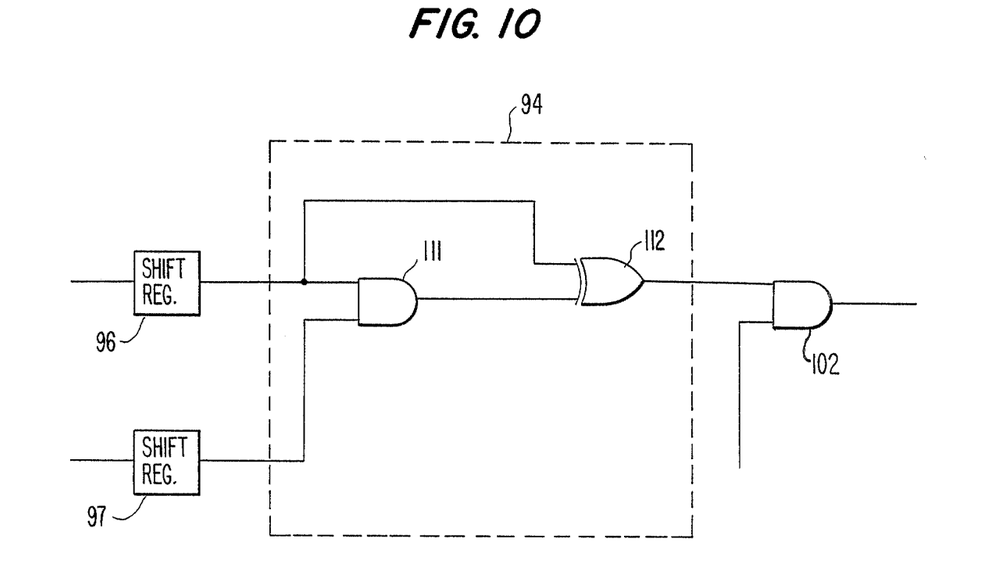
FIG. 10 is a detailed block diagram of a part of the apparatus of FIG. 9.

Now, the moving object extracting circuit 83 and the tremor eliminating circuit 84 will be explained with reference to FIGS. 9 and 10. In FIG. 9, the moving object extracting circuit 83 comprises of a one frame or one field memory 92, a shift register 93 for phase compensation, and an operation circuit 94. The tremor eliminating circuit 84 comprises shift registers 96 and 97 for determining the tremor eliminating limit in horizontal direction, pulse generators 98 and 99 for generating elimination pulses for horizontal and vertical tremors, AND circuits 102 and 106, and shift register 103 for determining the tremor eliminating region in vertical direction.

The contour image signal 91 from the signal conversion circuit 82 includes signals of the moving object image and the background image picked up by the television camera 1. First of all, the separation of these is performed as follows.

A certain one frame or field signal obtained at a particular time to is stored in the memory 92. On the other hand, other one frame or field signal obtained after $t_1$ is supplied to the operation circuit 94 through the shift registers 93 and 96. The stored signal in the memory 92 is read out coincidently with the output timing of the shift register 93, and is supplied to the operation circuit 94 through shift register 97. the operation circuit 94 is formed, as shown in FIG. 10, by an AND circuit 111 and an EXCLUSIVE OR circuit 112 in the same manner as the circuit shown in FIG. 6. The operation circuit 94 compares the signals at $t_0$ and $t_1$ and extracts shifted signal component as a moving object signal 100. In this case, the shift registers 96 and 97 determine half of tremor eliminating limit.

The output of the memory 92 is also supplied to the pulse generators 98 and 99. The pulse generator 98 generates a pulse signal 101 for eliminating the tremor signal in horizontal direction. When 256 picture elements exist in one horizontal scanning line, the pulse width of the pulse signal 101 from the pulse generator 98 may be set to a width corresponding to 4-6 picture elements. The pulse generator 99 generates a pulse signal 102 for eliminating tremor signals in the vertical direction. The pulse width of the pulse signal 102 from the pulse generator 99 may be set to a width corresponding to 4-6 scanning lines. The pulse generators 98 and 99 are made up of monostable multivibrators.

The moving object signal 100 from the operation circuit 94 and the pulse signal 101 are supplied to the AND circuit 102. If the moving object signal 100 shifts within the pulse width of the pulse signal 101, the moving object signal 100 is regarded as the tremor signal in horizontal direction, and eliminated by the AND circuit 102. If the moving object signal 100 shifts beyond the pulse width of the pulse signal 101, the moving object signal 100 is extracted as the shift signal of the moving object from the AND circuit 102.

The static background image is not extracted as the moving object signal 100 by the operation circuit 94. However, if a noise is superposed to the image signal, or a shift of the image signal occurs due to trembling of the television camera, or if jitter exists in the image signal, these are extracted as the tremor signals.

The tremor signal is furthermore generated by an aberation of two image pictures which occurs when comparing them, or after an image occurs when the television camera 1 is panned or tilted.

In order to eliminate these tremor signals, a means for eliminating tremor signals in a vertical direction is also provided. This means comprises the shift register 103, the pulse generator 99 and the AND circuit 106. The pulse generator 99 generates a pulse 102 having pulse width corresponding to 4–6 scanning lines. This pulse 102 is supplied to the AND circuit 106. The output signal from the AND circuit 102 is supplied to the shift register 103 which determines the tremor eliminating limit in the vertical region. When the output signal 104 of the shift register 103 shifts within the pulse width of the pulse signal 102, the output signal 104 is regarded as the tremor signal in the vertical direction, and is eliminated by the AND circuit 106. When the output signal 104 shifts beyond the pulse width of the pulse signal 102, the output signal 104 is extracted as the shift signal of the moving object from the AND circuit 106.

As described above, the tremor signals which are harmful to the detection of moving object signals in a picture image are removed, and the moving object signals are exactly extracted without detecting errors.

The operations of the signal conversion circuit 82, the control circuit 85 and the driving portion 86 are the same as those of the binary signal generator 53, the track control circuit 22 and the pan/tilt driving means 23 of FIG. 5. Therefore, no explanation is repeated.

What is claimed is:

1. A video signal processing apparatus comprising:
   an image pickup means for obtaining a video signal of a view which includes a moving target;
   a signal generating means for generating field signals in binary form from said video signal;
   a memory means for storing field signals of a first field and a second field from said signal generating means, said first and second fields being different from each other;
   a means for obtaining a logical sum of said first and second field signals from said memory means; and
   a signal extracting means for extracting a signal of said moving target by logically operating a field signal of a third field from said signal generating means and said logical sum, said third filed being different from said first and second fields.

2. A video signal processing apparatus as claimed in claim 1, further comprising a means for generating a control signal for driving said image pickup means to track said moving target, said control signal being obtained in connection with a deviation between a center of gravity of said extracted signal of said moving target and a center point of a reproduced effective picture obtained by said image pickup means.

3. A video signal processing apparatus as claimed in claim 1, further comprising a means for eliminating a tremor signal, said means including a pulse generator for generating a pulse having a pulse width corresponding to a limit of said tremor signal, and an AND circuit for receiving said pulse and said output signal of said signal extracting means.

4. A video signal processing apparatus as claimed in claim 1, wherein said memory means comprises two signal storing circuits, each respectively storing said field signals of said first and second field.

5. A video signal processing apparatus as claimed in claim 4, wherein said field signals are contour signals generated from said video signal.

6. A video signal processing apparatus as claimed in claim 1, wherein said memory means comprises a signal signal storing circuit, and said single signal storing circuit stores two field signals of different fields.

7. A video signal processing apparatus as claimed in claim 6, wherein said field signals are contour signals generated from said video signal.

8. A video system comprising:
   an image pickup means for obtaining a video image of a view which includes a moving target;
   a contour signal generating means for extracting a contour signal of said view from said video image;
   an operating circuit for obtaining a logical sum of two contour signals of said view which are obtained at different fields from said contour signal generating means;
   a circuit means for extracting a contour signal of said moving target by logically operating said output of said contour signal generating means and an output of said operating circuit;
   a means for generating a control signal for driving said image pickup means to track said moving target, said control signal being obtained in connection with a deviation between a center of gravity of said contour signal of said moving target and a reference point of a reproduced effective picture obtained by said image pickup means; and
   a driving means for panning and/or tilting said image pickup means under the control of said control signal.

9. A video system as claimed in claim 1, further comprising a means for eliminating a tremor signal, said means including a pulse generator for generating a pulse having a pulse width corresponding to a limit of said tremor signal, and an AND circuit for receiving said pulse and said output signal of said contour signal generating means.

10. A video system comprising:
    an image pickup means for obtaining a video image of a view which includes a moving target;
    a first circuit means for extracting a video image of a moving target by operating upon a first video image at one field and a second video image at another field;
    a second circuit means for extracting a video image of said moving target which shifts beyond a predetermined shifting amount;
    a means for generating a driving signal proportional to the deviation between a center gravity of said view image obtained from said second circuit means and a predetermined reference position signal; and
    a driving means for driving said image pickup means for tracking said moving target under the control of said driving signal.

11. A video signal processing apparatus comprising;
    an image pickup means for obtaining a video signal of an object;

a signal generating means for generating a binary contour output signal of said object from said video signal;

a memory means for storing said output signal from said signal generating means, and a signal extracting means for extracting a signal of a moving object by processing said output signal from said signal generating means and said output signal from said memory means;

wherein said signal generating means generates said contour signal of said object, and said memory means outputs a sum of said contour signals corresponding to different times, and said signal extracting means extracts a contour signal of said moving object by processing said contour signal of said object and said sum;

and wherein said signal extracting means comprises an EXCLUSIVE OR circuit for receiving said contour signal of said object and said sum, and an AND circuit for receiving an output signal of said EXCLUSIVE OR circuit and said contour signal of said object.

12. a video signal processing apparatus comprising; an image pickup means for obtaining a video signal of an object;

a signal means for generating a binary contour output signal of said object from said video signal;

a memory means for storing said output signal from said signal genrating means, and a signal extracting means for extracting a signal of a moving object by processing said output signal from said signal generating means and said output signal from said memory means;

wherein said signal generating means comprises a binary siganl generating circuit for generating a binary signal of said object, and said memory means comprises a memory circuit for storing said binary signal of said object, and said signal extracting means comprises a binary signal generating cirucit for generating a binary signal of said moving object;

and wherein said binary signal generating circuit comprises an AND circuit for receiving said output signal of said memory circuit and said binary signal of said object, and an EXCLUSIVE OR circuit for receiving an output signal of said EXCLUSIVE OR circuit and said binary signal of said object.

* * * * *